UNITED STATES PATENT OFFICE.

JOSEPH VAN RUYMBEKE, OF AURORA, ASSIGNOR TO JOBBINS & VAN RUYMBEKE, OF WEST AURORA, ILLINOIS.

COAGULANT.

SPECIFICATION forming part of Letters Patent No. 525,242, dated August 28, 1894.

Application filed April 24, 1889. Serial No. 308,465. (No specimens.)

*To all whom it may concern:*

Be it known that I, JOSEPH VAN RUYMBEKE, a subject of the King of Belgium, residing at Aurora, in the county of Kane and State of Illinois, United States of America, have invented a new and useful Composition of Matter to be Used as a Coagulant of Gelatinous Matter, of which the following is a specification.

I take green copperas and mix it with sulfuric acid at 60° Baumé and to the mixture I add a concentrated boiling solution of an alkaline bichromate, such as sodium bichromate or potassium bichromate. Suitable proportions are: copperas, three hundred pounds; sulfuric acid of 60° Baumé, one hundred and thirty pounds, and sodium bichromate, thirty-six pounds, or in place of the latter potassium bichromate, forty pounds. In this composition the copperas acts as a reducing agent and the bichromate acts as an oxidizing agent. The result is that the chromium trioxid of the bichromate is reduced to chromium sesquioxid, also called chromic oxid, and the ferrous oxid in the copperas is oxidized to ferric oxid. The sulfuric acid added combines with the bases to form ferric sulfate, chromic sulfate and an alkaline sulfate (sodium sulfate if sodium bichromate has been used and potassium sulfate if potassium bichromate has been used).

The proportions above given are only illustrative and I do not limit myself to them. When the boiling solution of the bichromate is added to the mixture of copperas, and sulfuric acid, the effect of the reaction is shown in the formation of a clear sirupy solution of a dark green color, and which is a peculiarly energetic coagulant of all gelatinous matters. This composition may be used wherever the effect of coagulation is desired, such as in the manufacture of fertilizer from tank water.

What I claim is—

1. The process of making a coagulant which consists in adding to a mixture of copperas and sulfuric acid a boiling solution of an alkaline bichromate, as set forth.

2. A new coagulating agent, consisting of a mixture of copperas, sulfuric acid and an alkaline bichromate, as described.

3. A new coagulating agent, consisting of ferric sulfate, chromic sulfate and an alkaline sulfate, as described.

JOSEPH VAN RUYMBEKE.

Witnesses:
FRANK A. TYLER,
WARREN TYLER.